Nov. 23, 1926.
C. C. CADDEN
1,607,815
WINDING FORM FOR RADIO APPARATUS
Filed Feb. 8, 1923     2 Sheets-Sheet 1
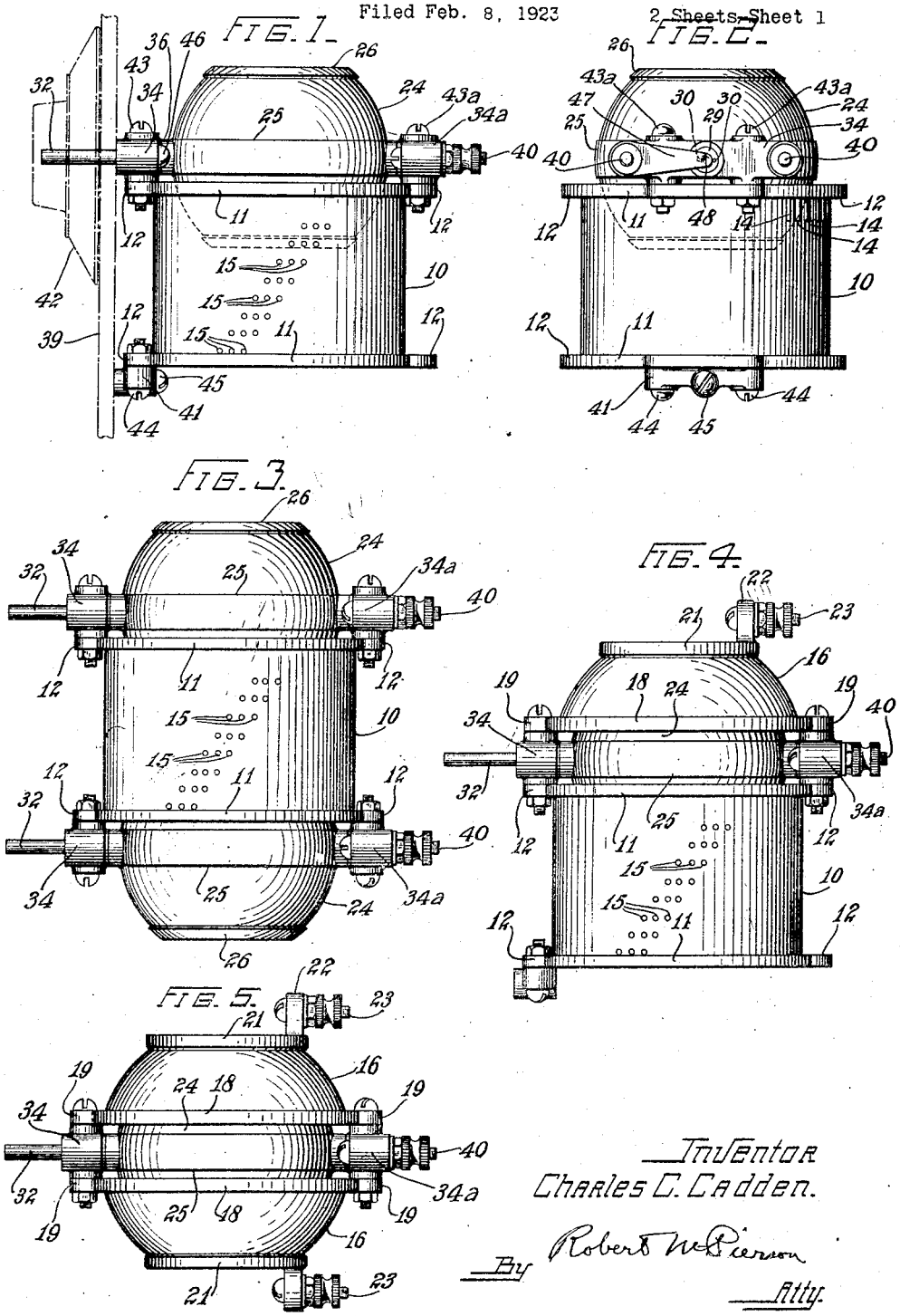
Inventor
Charles C. Cadden.
By Robert W. Pierson
Atty.

Nov. 23, 1926.
C. C. CADDEN
1,607,815
WINDING FORM FOR RADIO APPARATUS
Filed Feb. 8, 1923    2 Sheets-Sheet 2
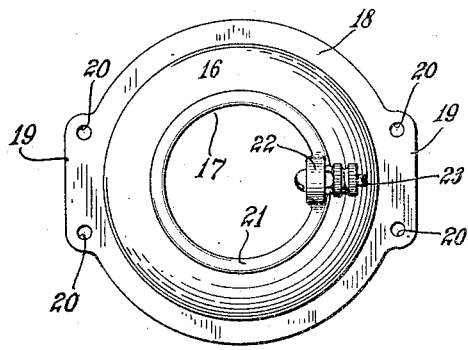
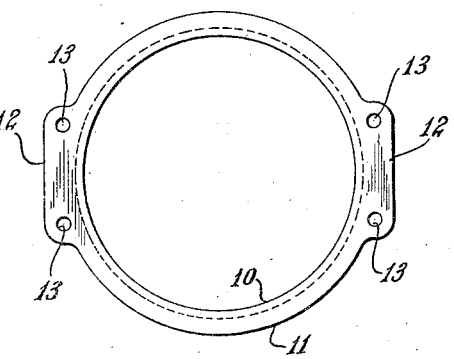
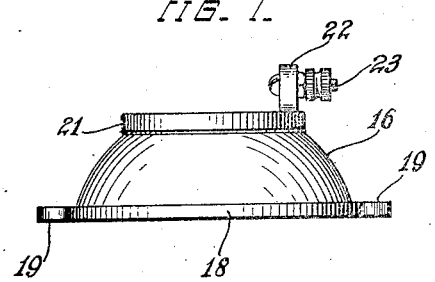
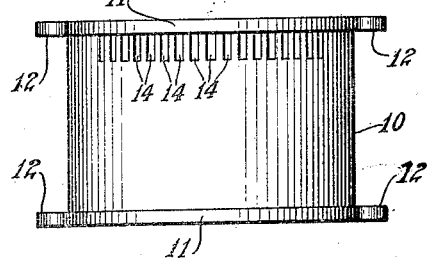
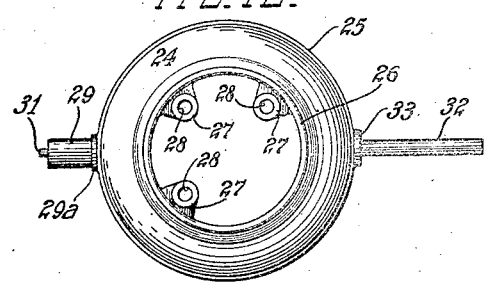
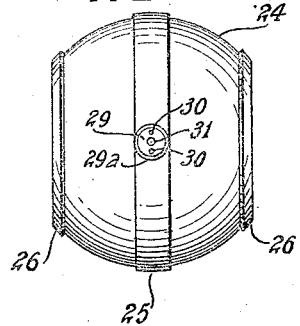
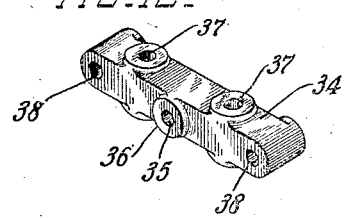
Inventor.
Charles C Cadden
By Robert McPierson
Atty.

Patented Nov. 23, 1926.

1,607,815

UNITED STATES PATENT OFFICE.

CHARLES C. CADDEN, OF AKRON, OHIO, ASSIGNOR TO THE B. F. GOODRICH COMPANY, OF NEW YORK, N. Y., A CORPORATION OF NEW YORK.

WINDING FORM FOR RADIO APPARATUS.

Application filed February 8, 1923. Serial No. 617,720.

This invention relates to winding forms for radio apparatus and its general object is to provide a set of forms adapted to be assembled in a variety of combinations alternatively to provide several different instruments, single-rotor and double-rotor variocouplers and long and short wave variometers being examples.

Further objects are to provide, in such a set, forms adapted to be conveniently molded of dielectric material such as hard rubber, and forms and associated parts adapted to be readily replaced in case of breakage or defectiveness.

Of the accompanying drawings:

Fig. 1 is an elevation of certain of my improved forms and associated parts assembled as a variocoupler, the wire windings being omitted.

Fig. 2 is an elevation of the same as viewed from the right of Fig. 1.

Fig. 3 is an elevation of a double rotor variocoupler assembly embodying a preferred form of my invention.

Fig. 4 is an elevation of a single circuit variocoupler or long-wave variometer assembly.

Fig. 5 is an elevation of a short-wave variometer assembly.

Fig. 6 is a plan view of a hemispherical stator form.

Fig. 7 is an elevation of the same.

Fig. 8 is a plan view of a cylindrical stator form.

Fig. 9 is an elevation of the same.

Fig. 10 is a plan view of a rotor form.

Fig. 11 is an elevation of the same as viewed from the left of Fig. 10.

Fig. 12 is a perspective view of a bearing bracket or clamping member.

Referring to the drawings, 10 is a hollow, generally cylindrical form integrally provided with external end flanges 11, 11, extended at opposite sides of the form to provide attachment ears 12, 12, said ears being formed with bolt holes 13, 13 (Fig. 8), to receive clamping bolts or binding posts. Said form is provided near one end with a series of longitudinal slots 14, 14 (Figs. 2 and 9), stepped about a part of its circumference, and throughout a substantial part of its length with parallel rows of perforations 15, 15 (Figs. 1, 3 and 4), said slots and perforations being provided for the taking off of taps from a wire winding on said form, as described and claimed in the copending joint application of Charles C. Cadden and Harry Dewhirst, Serial No. 602,023, filed November 20, 1922.

A hollow, generally hemispherical form 16, open at its pole as shown at 17 (Fig. 6), is provided with an integral, external, base flange 18 of substantially the same size as the flanges 12 of the cylindrical stator form 10, and said flange 18 is extended at opposite sides to provide attachment ears 19, 19, said ears being formed with bolt holes 20, 20 (Fig. 6), adapted to be registered with the bolt holes 13 of the cylindrical stator form.

The pole end of the hemispherical stator form 16 is provided with an integral reinforcement flange 21, from which projects an ear 22 formed with a hole to receive a binding post 23. Suitable perforations, not shown, may be provided in the wall of the hemispherical stator form to facilitate the anchoring of a wire winding thereon.

A hollow, open-ended, ball-rotor form 24 is provided with an equatorial flange 25 and end flanges 26, 26 limiting its winding surfaces; with integral, internal ears 27, 27 (Fig. 10), having holes 28, 28 for binding posts; and with an integral trunnion 29 having a boss 29$^a$ at its base and having holes 30, 30 (Figs. 2 and 11), running from its end face to the interior of the form and adapted to receive the terminal portions of a winding on said rotor form. Suitable perforations may be provided in the wall of said form for carrying the wires to and from its exterior, and the wire or wires of the winding may be anchored or electrically connected by means of suitable binding posts mounted in the holes 28 of the ears 27. The extremity of the trunnion 29 is formed with a small, axial pin or projection 31 adapted, as hereinafter described, to constitute a thrust-bearing member. Opposite the trunnion 29 the rotor form is provided with a shaft or adjusting stem 32, preferably of metal, for strength, said stem projecting from a boss 33 formed on the main body of the form.

For supporting two or more of the forms above described in assembled relation, bearing brackets or clamping members 34, 34, 34$^a$, 34$^a$, adapted to be used in various combinations of forms, are provided. Each of the brackets 34 comprises a block horizontally traversed at its middle by a bearing aperture 35 (Fig. 12), adapted to receive the bearing stem 32, of the rotor form 10, said bearing aperture being surrounded, at one side of the block, by a boss 36 adapted to abut the boss 33 of the rotor. At each side of the bearing aperture the block 34 is formed with a vertical bolt hole, 37, 37, embossed at both the upper and lower sides of the block, and so spaced apart as to be registrable with the holes 13 in an ear 12 of the cylindrical stator form 10 or the bolt holes 20 in an ear 19 of the hemispherical stator form 16. The end portions of the block are formed with respective horizontal bolt holes 38, 38, parallel with the bearing aperture 35, for attaching the block to a support such as the instrument board 39 represented in broken lines in Fig. 1.

The bracket 34ª, for the opposite journal of the rotor, is of the same construction as the bracket 34 just described, except that the bearing aperture corresponding to the aperture 35 is larger, so as to receive the trunnion 29 of the rotor, which trunnion, being of large size, may be of molded dielectric material, integral with the body of the rotor form. The holes in the brackets 34ª corresponding to the bolt holes 38 in the brackets 34, are adapted to receive binding posts 40, 40 (Figs. 1 to 5), for the rotor wires.

In combinations where only one rotor is used with a cylindrical stator, as in Figs. 1, 2 and 4, a simple bracket member 41, adapted to be bolted to one of the ears 12 of the cylindrical stator and to the instrument board 39, is provided.

Referring to the several combinations of forms shown in the drawings, in Figs. 1 and 2, a cylindrical stator form 10 is assembled with a rotor form 24, bearing brackets 34, 34ª, and a supporting bracket 41, to provide a variocoupler assembly, the instrument board being represented in dotted lines at 39 and the dial at 42. Bolts securing the brackets 34, 34ª to the stator form are shown at 43, 43ª respectively, and the bolts securing the latter to the supporting bracket 41 are shown at 44, 44. It will be understood that the supporting bracket 41 and also the bearing bracket 34 as described are adapted to be bolted to the instrument board, bolts therefor being shown at 45 and 46 respectively.

On one of a pair of binding posts 40, 40 mounted in the bracket 34ª is secured a flat spring 47, its free end being formed with a dimple 48 and bearing against the pin 31 of the rotor's trunnion 29, said spring thus being adapted yieldingly to urge the rotor toward the instrument board, against the boss 36 of the bracket 34, while permitting it to be rotated, and so to prevent unintended fluctuations of inductance such as might otherwise result from axial movement of the rotor, in case of slight variance of dimensions such as may occur in successively substituted forms.

Examples of other devices which may be provided by different combinations of my improved forms are shown in Figs. 3, 4 and 5. In Fig. 3 a double-rotor variocoupler assembly is provided by combining two of the rotor forms with the cylindrical stator form. In Fig. 4 a cylindrical stator, a hemispherical stator and a rotor are combined in a single circuit coupler or long-wave variometer assembly. In Fig. 5 a short wave variometer assembly is provided by a combination of two hemispherical stator forms and a rotor form. In all of these combinations the bearing brackets 34 and 34ª are used without modification and the former are adapted in all instances to serve as means for attaching the assembly of forms to the instrument board.

The several forms and brackets may conveniently be molded of dielectric material such as hard rubber, and as they are adapted for use in many types of radio sets, and in a large number of combinations to provide different instruments or instruments of different inductance range, substantial economy is made possible by my invention, particularly as to experimenters, amateurs or others who have frequent occasion to modify or rearrange their sets.

Modifications may be resorted to without departing from the scope of my invention and I do not wholly limit my claims to the specific construction shown, nor to the specific combinations of forms herein described.

I claim:

1. Radio apparatus comprising a set of winding forms of widely different size and shape adapted to be assembled in different combinations to provide instruments having different characteristics, said forms having attaching portions adapted to function in such different combinations, and means adapted to coact with said attaching portions to hold said forms assembled in said different combinations.

2. Radio apparatus comprising a set of interchangeable winding forms of widely different size and shape including a rotor form and a stator form, forms of said set being adapted to be assembled in different combinations to provide instruments having different characteristics, and means for securing said forms assembled in such different combinations.

3. Radio apparatus comprising a set of winding forms including a rotor form and a stator form, said forms being adapted to be assembled in different combinations to provide instruments of different characteristics and having attachment portions adapted to function in such different combinations, and a bearing bracket for said rotor form adapted to be mounted on a support and to constitute a support for said stator form.

4. Radio apparatus comprising a hollow, cylindrical, stator winding-form provided with an oppositely positioned pair of attachment ears at each of its ends, a pair of journal members secured respectively to the ears of one of said pairs, said journal members being formed with bolt holes disposed laterally with relation to said stator form, and a rotor form journaled in said journal members.

5. Radio apparatus comprising a set of winding forms adapted to be assembled in different combinations to provide instruments of different characteristics, said set including a plurality of hollow stator forms and a rotor form, and said stator forms being provided with registrable attaching means, and bearing brackets for said rotor form adapted to be interposed between said stator forms and secured to their respective attaching means.

6. Radio apparatus comprising a hollow, cylindrical winding form having an oppositely positioned pair of attachment portions at each of its ends, an attachment member secured to one of said attachment portions, a pair of journal members secured respectively to the attachment portions of the other pair, and a rotor form journaled in said journal members.

7. Radio apparatus comprising two hollow winding forms each having at an end thereof external projections formed with bolt holes, the bolt holes of one form being registrable with those of the other, a pair of journal members adapted to be interposed between said forms, said journal members being formed with bolt holes registrable with those of the forms and each with a bearing aperture transverse to said bolt holes, and a winding form adapted to be mounted within said hollow forms and to be journaled in said journal members.

8. Radio apparatus comprising a ball-rotor winding form and two stator winding forms adapted to be assembled therewith in different combinations, said stator forms being provided with registrable attaching means whereby one of them may be substituted for the other or both may be assembled with said rotor form.

9. Radio apparatus comprising a hollow, cylindrical winding form having outwardly projecting, perforate, attaching means at one end thereof, a hollow hemispherical winding form having similar attaching means at its larger end, the perforations of the hemispherical stator being registrable with those of the cylindrical stator, and a winding form adapted to be mounted within and journaled between said hollow forms.

10. Radio apparatus comprising a rotor winding form, a bearing member therefor adapted to be attached as a supporting bracket to a fixed support, and a pair of stator winding forms adapted to be assembled on opposite sides of said rotor form and secured to said bearing member, and each to be substituted for the other.

11. Radio apparatus comprising a set of winding forms adapted to be assembled in different combinations to provide instruments having different characteristics, said forms having attaching portions adapted to function in such different combinations, means adapted to coact with said attaching portions to hold said forms assembled in said different combinations, and yielding means for urging said rotor form axially against one of its bearings, while permitting it to be turned, to prevent axial play of the rotor in use.

In witness whereof I have hereunto set my hand this 2 day of February, 1923.

CHARLES C. CADDEN.